Figure 1:
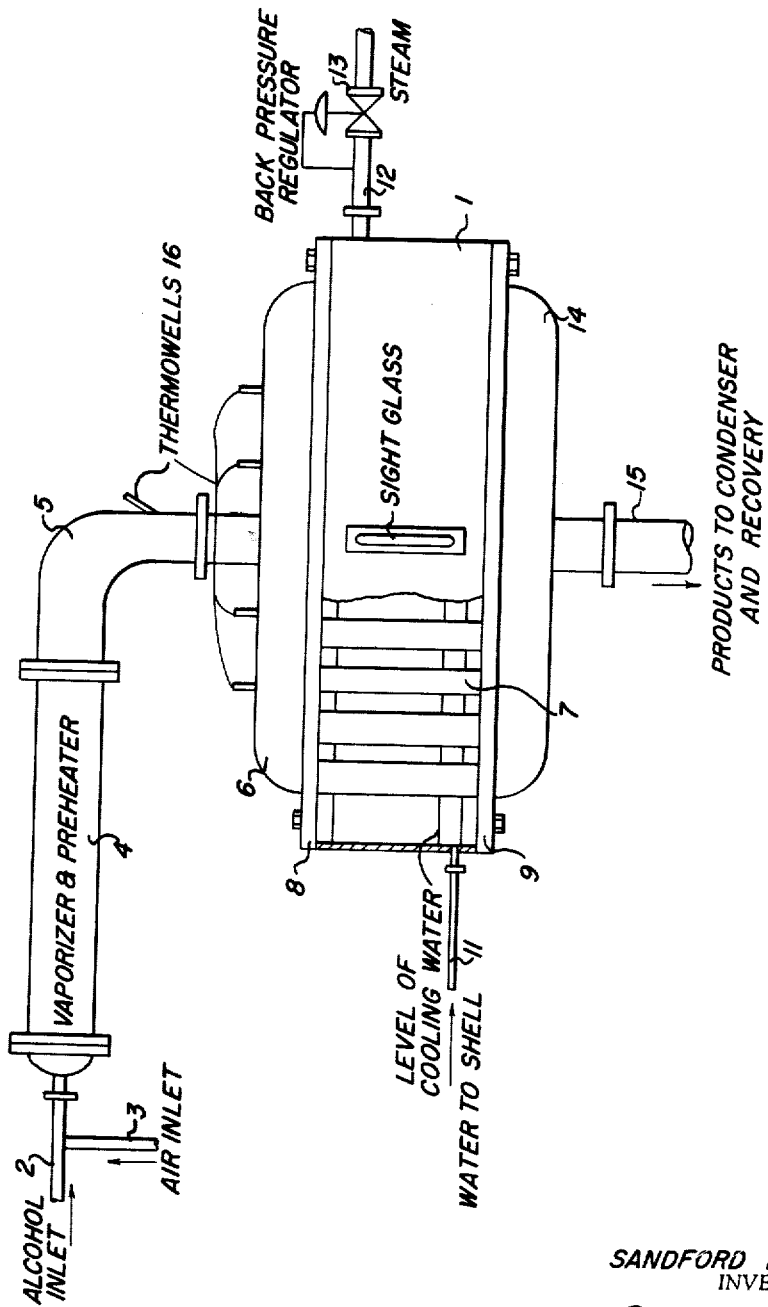

Oct. 8, 1963 S. D. NEELY 3,106,581
CONVERSION OF ETHYL ALCOHOL TO ACETALDEHYDE
Filed March 26, 1959 4 Sheets-Sheet 4

SANDFORD D. NEELY
INVENTOR.

BY R. Frank Smith
Harold N. Powell
ATTORNEYS

United States Patent Office 3,106,581
Patented Oct. 8, 1963

3,106,581
CONVERSION OF ETHYL ALCOHOL TO
ACETALDEHYDE
Sandford D. Neely, Kingsport, Tenn., assignor to Eastman Kodak Company, Rochester, N.Y., a corporation of New Jersey
Filed Mar. 26, 1959, Ser. No. 802,198
6 Claims. (Cl. 260—603)

This invention relates to the conversion of alcohols to carbonyl compounds. More particularly, this invention concerns the conversion of ethyl alcohol to acetaldehyde.

The production of carbonyl compounds such as aldehydes and ketones from alcohols is a type of manufacture that has been of industrial interest and use for many years. Consequently, a large number of articles and patents have been published pertaining to this subject matter. These publications describe not only various types of processes for converting the alcohols to carbonyl compounds, but describe various types of catalysts and equipment and related features that may be used.

One mode of operation which has attained fairly large-scale and widespread use involves mixing oxygen-containing gas (such as air) with alcohol and passing this mixture over or through a suitable catalyst. Such reaction may be formulated as follows:

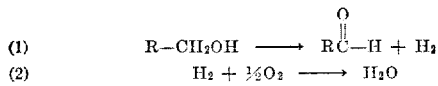

The reaction represented by Equation 1 is an endothermic one in that heat is required for it to be maintained. The reaction represented by Equation 2 is an exothermic one and considerable heat is liberated. Since both of these reactions take place in the reaction zone, the heat liberated by Equation 2 will supply energy for Equation 1. Thus, in the conversion of alcohols to carbonyl compounds wherein oxygen is included along with the alcohol, it is necessary to control the temperature of the reaction.

In certain prior art processes it has been proposed to control the reaction temperature by limiting the amount of the oxygen supplied to the reaction. Such type of control is not particularly satisfactory because the equilibrium of the action is shifted in an unfavorable manner. Expressed in another way, the more hydrogen that can be burned, as shown by Equation 2, will cause the equilibrium of the reaction illustrated by Equation 1 to be shifted to a more favorable position.

A number of other expedients have been suggested in the prior art for controlling the temperature of the exothermic reaction. For example, it has been proposed to introduce water or other coolant into the alcohol mixture. However, such diluents not only occupy valuable reaction space, but tend to dilute the reaction products produced. Similar comments apply to the situation when water sprays and the like are sprayed into the carbonyl produced reaction products for the cooling thereof.

Although many of the prior art processes have been operated with very good efficiency, in general, decomposition losses and the like have been in excess of 1 or 2%. When considering the large volume of operation involved in the conversion of alcohols to carbonyl compounds, even losses of only the order of a few percent may be quite significant.

Therefore, it is believed apparent that the development of still further improved processes and apparatus for the conversion of alcohols to carbonyl compounds and particularly the conversion of ethyl alcohol to aldehyde represents a highly desirable result. After an extended investigation on both a laboratory and considerably larger scale, I have found how methods of the class described may be improved in certain respects.

One object of the present invention is to provide improved method and apparatus for the conversion of alcohol to carbonyl compounds. A particular object is to provide an improved method and apparatus for the conversion of ethyl alcohol to acetaldehyde whereby decomposition losses of the aldehyde are reduced to a very low value. Another object is to provide a method which involves the combination of external cooling for the control of the catalytic action wherein alcohol is converted to the carbonyl compound in combination with a very rapid after cooling of the carbonyl reaction products for minimizing losses thereof because of decomposition reactions. Still another object is to provide improved apparatus particularly adapted for carrying out the aforementioned process operations. Other objects will appear hereinafter.

In the broader aspects of my invention, I have found that decomposition losses in processes for converting alcohol to carbonyl compounds and particularly in the conversion of ethyl alcohol to acetaldehyde or other alcohols of two or more carbon atoms to their corresponding carbonyl compound, may be improved by externally cooling the reaction in a certain manner together with the very rapid cooling in a particular manner to be described in detail hereinafter of the carbonyl reaction products. In my process of the present invention maximum oxygen input for conversion may be accomplished. In other words, there is no requirement in my process of reducing the oxygen input in order to prevent the exothermic reaction taking place to a maximum extent. Likewise, in my process it is not necessary to dilute the alcohol and oxygen mixture with cooling diluents or otherwise adopt comparable expedients which tend to reduce the efficiency of the process. Other distinctions and advantages of the present invention over prior art methods and apparatus will be apparent as the description proceeds.

For assistance in the further understanding of the instant invention, reference is made to the attached drawings forming a part of the present application.

Figure 2:
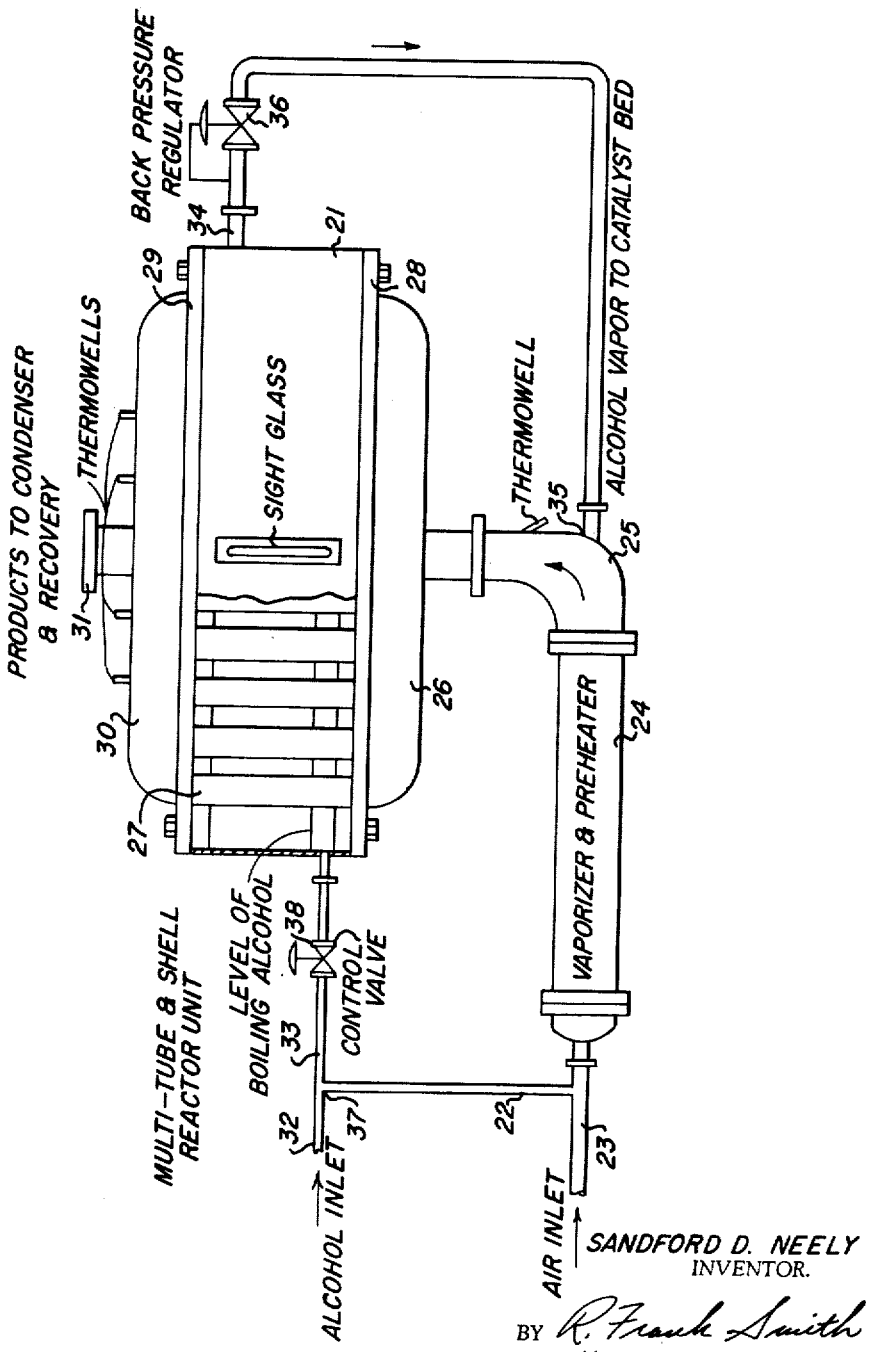
Figure 3:
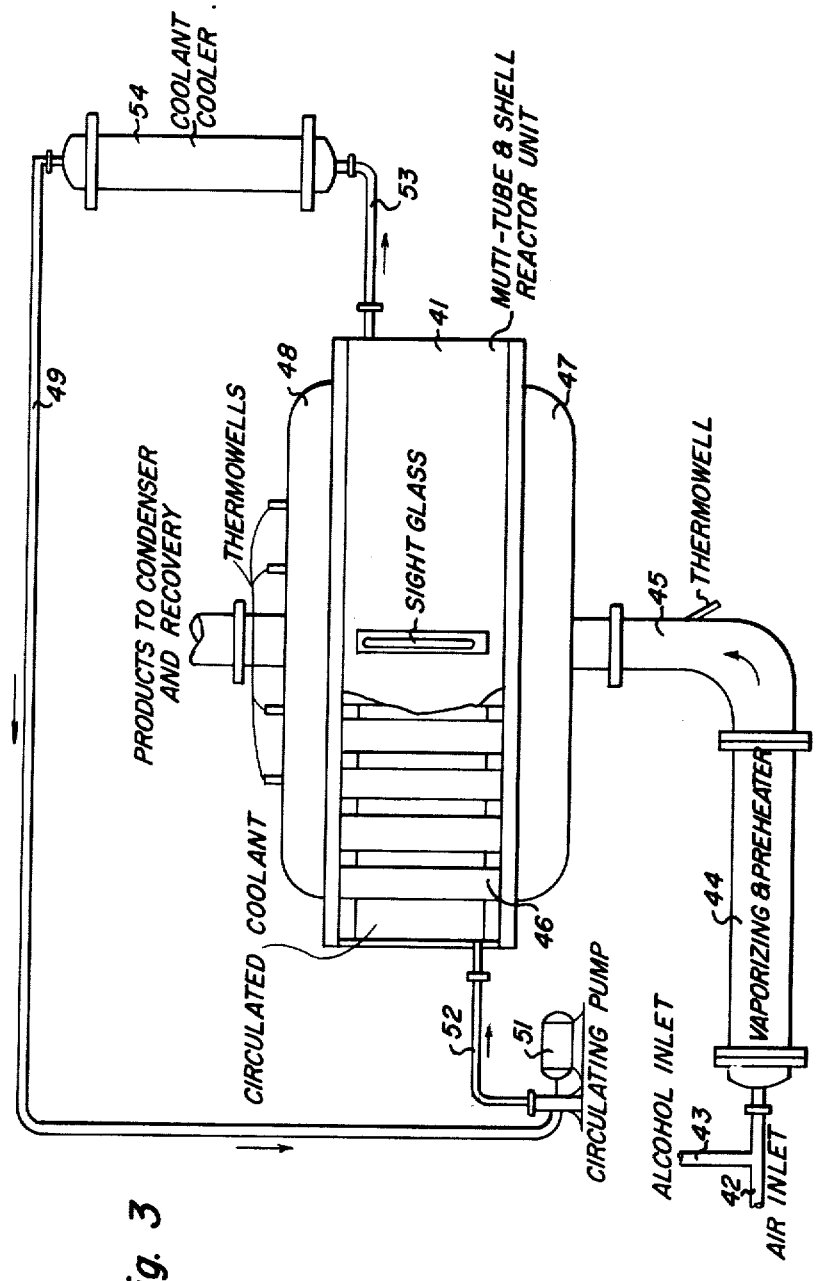

In the attached drawings, FIGS. 1, 2 and 3 are semi-diagrammatic side elevation views partly in section of various arrangements of my reactor and associated parts which may be used for carrying out the process of the present invention.

Figure 4:
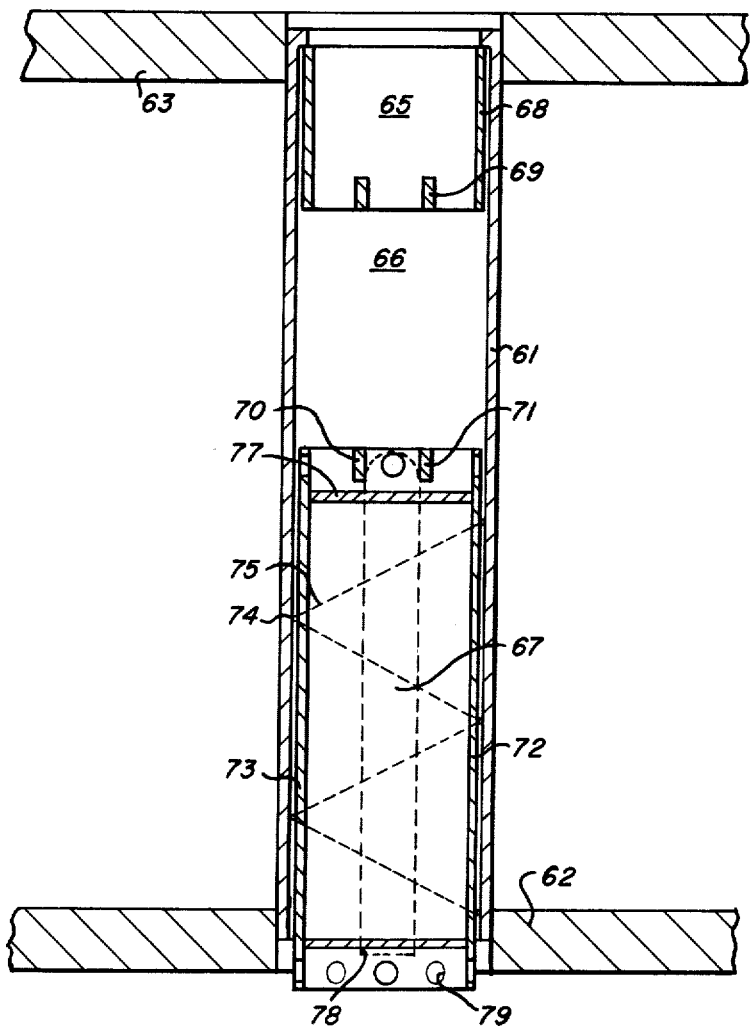

FIG. 4 is a sectional view showing the internal construction and arrangement of one of the tubes, of which there are a plurality contained in the aforementioned reactors.

Referring now to FIG. 1, the over-all reactor 1 is of a construction somewhat similar to conventional tube and shell-type units already used in the industry. Suitable inlet conduits 2 and 3 are provided it for introducing the air and alcohol into a vaporizer and preheater 4. Since structure 4 may comprise any conventional tube bundle heater, extended description thereof is unnecessary. Such part 4 functions to raise the feed material to the proper preheat temperature.

The preheater is connected with the reactor by means of an enlarged conduit member 5. This member is of a sufficient size to carry the vapors resulting from vaporizing the liquid alcohol in vaporizer 4. This enlarged conduit feeds into the header 6 which supplies the plurality of catalyst containing tubes 7.

The internal construction of these tubes is an important feature of my invention and the details thereof will be described more fully in connection with a consideration of FIG. 4. Hence, it is sufficient at this point to merely indicate that the plurality of tubes is held in the apparatus by means of the tube sheets 8 and 9.

Suitable conduit means are provided at 11 for introducing water coolant into the apparatus around the outside of the catalyst tubes such as tube 7. Also provided as an exit to this space around the outside of the tubes is exit conduit 12 which contains back pressure regulator 13. The purpose of this construction is to permit sufficient pressure to build up in the interior of the apparatus so that with a coolant such as water useful steam may be generated.

Referring now to the lower part of the reactor 1 there is provided a lower header 14 into which all of the reaction products from the tubes discharge. This header is provided with an exit conduit 15 which may lead to conventional condensers, reaction apparatus, storage tanks or the like. In other words, the carbonyl products produced in my reactor may be withdrawn from the reactor to conventional equipment, utilization or storage and, therefore, extended description of such parts appears unnecessary.

The apparatus may be provided with a plurality of thermo wells designated part 16. The apparatus may be bolted together or otherwise constructed for ease of disassembly. Inasmuch as such features are known in the art and utilized in existing reactor units for converting alcohol to carbonyl products, extended description of such features likewise appears to be unnecessary.

Attention will now be turned to FIG. 2 which shows a modified arrangement but in which many of the parts are substantially similar to parts already described in connection with FIG. 1. In FIG. 2 the over-all reaction unit is designated 21. Suitable alcohol inlets are provided at 22 and 23. The vaporizer and enlarged conduit leading into the unit are provided at 24 and 25. The inlet header which feeds the plurality of tubes is at 26. The tubes 27 which contain catalyst would presumably be of the same internal construction as will be described in connection with FIG. 4. These tubes are held in place by tube sheets 28 and 29.

The withdrawal of the carbonyl reaction products is accomplished through header 30 and exit conduit 31.

One principal difference in the construction of the apparatus of FIG. 2 over the construction of FIG. 1 is that in FIG. 2 provision has been made to use the alcohol as a coolant. Accordingly, there is provided an inlet 32 for the cold alcohol. A part of this alcohol may be passed through valved conduit 33 into the reactor so that it may circulate around the exterior of the tubes such as tube 27. This not only cools the tubes, but preheats and vaporizes the alcohol. This preheated alcohol may be withdrawn by means of conduit 34 and fed into the large conduit 25 at point 35. A suitable back pressure regulator is provided at 36 for regulating the degree of heating which it is desired to apply to the alcohol.

A portion of the alcohol may be diverted at point 37 to proceed through inlet 22 to be preheated and vaporized in a manner such as described in connection with FIG. 1. A control valve is also provided at point 38. By suitable regulation of the quantity of alcohol fed into unit 21 around the exterior of the various catalyst tubes together with the adjustment of back pressure regulator 36, it is possible to control the amount of heat withdrawn from the catalyst tubes and thereby regulate the reaction temperature.

In connection with the apparatus of FIG. 2, suitable means such as thermowells may be provided for convenience of measuring temperatures, certain of the parts may be bolted together for convenience of assembly or disassembly. Since such features may be in accordance with known constructions, extended description thereof is unnecessary.

Referring now to FIG. 3 it will be observed that many of the parts contained in this figure are substantially comparable to similar parts already described in connection with FIGS. 1 and 2. Hence, only brief reference will be made to such parts. That is, the apparatus of FIG. 3 includes the over-all reactor 41. Suitable conduit means 42 and 43 are provided for supplying alcohol and air to a vaporizer and preheater 44 which feeds into unit 41 by means of the enlarged conduit 45.

Reactor 41 is provided with a plurality of tubes such as tube 46, containing catalyst as well as with headers 47 and 48 for suitably distributing the feed materials to the catalyst tubes as well as for the withdrawal of the catalyst products from the tubes. The structure of 43 differs from the preceding constructions in that means have been provided for the forced external cooling of the catalyst containing tubes such as tube 46. This construction comprises the coolant withdrawal conduit 53 which leads from the upper portion of the chamber surrounding the catalyst tubes. The heated coolant withdrawn through conduit 53 is brought to a suitable cooler 54 in which the heat may be withdrawn from the coolant. The coolant thus reduced in temperature is recirculated through conduit 49 by means of circulating pump 51. The coolant is then pumped through conduit 52 back into the space around the catalyst tubes so that it may withdraw more reaction heat.

FIG. 4 will now be considered. A somewhat detailed discussion thereof is set forth inasmuch as the construction and arrangement of the parts of FIG. 4 has an important bearing on the functioning of the present invention. The tube designated over-all as 61 comprises an illustration of the tubes 7, 27 and 46 referred to above. Only a single tube is described, it being understood that all of the other tubes contained in the reactors would be of a similar construction. These tubes would be held at each end by tube sheets 62 and 63, such tube sheets already having been referred to in connection with the reactors described. Tube 61 may be fastened into the tube sheet by welding or by mechanical means or otherwise in any suitable manner that holds the tubes in the tube sheet in a secured fluid-tight arrangement.

Tube 61 is preferably constructed of a metal such as stainless steel of a composition of type 316 or type 304 or other metal such as steel of a composition of A285 Grade C. Tube sheets 62 and 63 or hold down plates as they may be termed may likewise be constructed of the same type of metal but of a heavier gauge. Likewise, the remainder of the conduits and apparatus parts described above may be constructed of the same type of metal. Other types of stainless steels such as type 321, 310 and 347, which may be procured commercially may likewise be used. Also, in certain instances the tubes may be made of ceramic materials.

The thickness of the walls of tube 61 is maintained to as low a value as possible, constant with safety and stable mechanical strength in order that there can be a good heat transfer from the reaction inside the tube to the coolant on the outside of such tube. Dependent on the pressure of the incoming feed alcohol-air mixture, tube wall thicknesses of ⅛ inch are usually satisfactory when the tubes are constructed out of stainless steel.

The inner portion of tube 61 may be considered as comprising the three sections: section 65, the alcohol-oxygen inlet area; section 66, the catalyst area; and section 67, the very rapid cooling area for the reaction products.

The alcohol inlet area may include a suitable sleeve member 68 and associated part 69. These parts may be constructed of stainless steel. They function for distributing the alcohol-air mixture as well as for positioning the catalyst. The catalyst 66 is preferably comprised of suitable metal screens, such type of screens and their preparation is already described in U.S. Patent 2,682,560 granted to my coworkers in this field. While I prefer a silver screen or copper screen catalyst, the present invention is not limited to these exact catalysts. The numerous publications and patents referred to above show that there are an extremely large number of catalyst materials and forms of catalyst materials which may be used in the conversion of alcohols to carbonyl compounds. Therefore, in the broader aspects of the present invention I contemplate using any suitable form of catalyst which may be positioned in a suitable manner within the tubes, 61, such as at section 66. Screen catalysts are very satisfactory to use because they may be positioned and supported on internally extending lugs as at 70 and 71.

Attention will now be turned to the construction of part 67 which comprises the portion whereby very rapid cooling of the reaction products may be accomplished. This part 67 is comprised of an inner cylinder, the walls of which as at 72 and 73 are spaced in very close proximity to the inner walls of tube 61. Suitable spacing of this inner tube member as well as other advantages may be accomplished by encircling the inner tube member with a few turns of wire or other such metal configuration so as to form a spiral conduit as indicated at points 74 and 75. For example, assuming it is desired to keep the spacing relatively close, the inner tube member 67 is constructed of the appropriate diameter and then encircled with two or three turns of wire of a diameter or gauge of 16 BWG. The size of the wire which may be used for this purpose as well as the size of the spacing may vary from $\frac{1}{32}''$ to $\frac{1}{8}''$. The wire just described in a spiral around a tube member serves many purposes. It serves to force the reaction product gases around the tube walls, which are surrounded by the coolant, at a high velocity. This high velocity permits heat transfer and reduces the time at which the reactants are above a temperature of, for example, 350° C. Another valuable feature is that this spiral creates a relatively high pressure drop when compared to the pressure drop through the catalyst bed. By suitable adjustment of this wire spiral, equal pressure drop can be maintained through all the tubes in the reactor. This is an important feature in securing equal flow through all the tubes. That is, balanced operation may be accomplished.

With further reference to this inner tube 67 it will be observed that it is provided with solid headers at 77 and 78 so that the reaction products issuing from the catalyst section 66 are forced against the side walls. The ends of this inner tube member may be provided with holes or other openings as at 79 for the purpose of distributing the flow to the outlet header. The inner member as well as the wire spiral may be constructed of metals of the type already described above or of other materials such as can withstand the environment.

The operation of my process is though apparent to a substantial extent to one skilled in the art from a consideration of the drawings in connection with the several legends appearing thereon and from the preceding description of the various apparatus parts. However, some brief general process description will now be set forth.

In starting up the process of converting alcohol-air mixtures to carbonyl compounds in the apparatus above described, the apparatus is brought up to temperature by passing externally formed heating gases therethrough. This may be accomplished in a manner along the lines referred to in companion Patent 2,682,560. That is, the temperature of the catalyst section 66 would be brought up to a temperature of, for example, between 350° C. and 700° C. in some suitable manner. However, the exact temperature of the catalyst and certain other operations and details will depend to some extent on the particular alcohol being processed and the like features. In general the process of the present invention may be operated under temperature conditions as respects the temperature of the catalyst as well as certain other conditions approximately the same as heretofore used in the prior art. Also, as already indicated, prior art catalysts or special screen catalysts may be employed in the catalyst section. As will be described hereinafter, however, in the preferred operation of the present invention the conditions set forth in the several examples which follow are used.

In all instances in accordance with the present invention, the features of externally cooling the reaction zone is utilized in combination with the special feature of very rapidly cooling the reaction products in a manner as discussed in connection with FIG. 4.

Therefore, in the present invention the alcohol to be converted to the carbonyl compounds together with the proper amount of oxygen for the most efficient operation is passed through the preheater, vaporizer and into the header of the catalyst tubes. The alcohol-oxygen mixture passes in contact with the catalyst and the carbonyl reaction products are produced. Since the over-all reaction is exothermic, a considerable amount of heat is liberated. However, it is not necessary in the present invention to reduce the oxygen input, as has been suggested in the prior art for keeping the temperature down because the various external cooling provisions fully described in connection with FIGS. 1, 2 and 3 permit the dissipation of the heat from the catalyst zone. That is, the heat may be suitably withdrawn and utilized for the generation of steam, preheating the reactants of alcohol and the like or by a combination of such procedures.

By the operation with suitable oxygen input as just described, maximum conversion of the alcohol to the carbonyl compound is accomplished.

Then by the very rapid cooling of the instant invention utilizing the construction described under FIG. 4, the loss of the carbonyl reaction product by decomposition is substantially prevented. That is, in my process, the product stream leaves the catalyst zone and is forced to travel in an annular space between the inner surfaces of the tube 61 and the outer surfaces of the tube 67. As already explained above, in view of the wire positioned spirally in this narrow space, the product stream travels at a high velocity and in close contact with the wall of tube 61 which wall is surrounded by coolant. This high velocity and contact with the wall gives a rapid rate of heat transfer and quickly reduces the temperature of the carbonyl reaction products to a sufficiently low value that the decomposition reactions are substantially halted or minimized to a value that losses are negligible. That is, in the process of the present invention, loss of the desired products because of the formation of decomposition products is reduced to less than 1%. As a specific illustration the carbon monoxide in the off-gas of the process of the present invention is down to a value within the range of .2–.5% whereas in many prior art processes the amount of the carbon monoxide has been greater than 1%.

A further understanding of my invention will be had from a consideration of the following examples for illustrating certain of the preferred embodiments.

*Example 1*

In this example the conversion of ethyl alcohol to acetaldehyde was carried out in accordance with the present invention. After the catalyst had been brought up to a temperature of approximately 380° C., alcohol and air were fed through the preheater, vaporizer and into the catalyst. The feed mixture was supplied at the rate of 1.96 moles/hr./tube, the amount of oxygen with respect to the amount of alcohol was 0.202 mole, $O_2$ per mole ethyl alcohol and was sufficient to promote the most efficient conversion of the alcohol to acetaldehyde.

The conditions of operation in the catalyst zone were a reaction temperature of 480° C. on a silver screen catalyst to a depth of approximately three inches.

The acetaldehyde containing reaction product exiting from the catalyst zone was very rapidly cooled by passing through the narrow space containing the wire. The speed of passage of the acetaldehyde was of the order of 462 ft./second and the temperature of the aldehyde containing reaction produced was reduced by this rapid passage from 480° C. down to 350° C. in a very rapid time of 0.004 second.

The aldehyde produced and withdrawn from the apparatus was subjected to the further treatments including further refining in conventional distillation equipment to a suitable concentration for conversion to acetic acid or sale. The conversion, amounts of decomposition products and the like values for the operation of this example were as follows:

CO—0.3% with equivalent amounts of $CH_4$
Conversion—62.2% (yield per pass)

*Example II*

In this example the conversion of ethyl alcohol to acetaldehyde was carried out but different conditions were used as follows:

Heat to 380° C.
Feed rate 1.93 moles/hr./tube
0.262 mole $O_2$/hr./tube
Reaction temperature 410–480° C.
Silver catalyst to depth of 3 in.
Velocity of exit 475 ft./sec.
Temperature reduced to 350° C. in 0.004 sec.
Conversion 82%
$CO_2 = 0.66\%$

*Example III*

In this example the conversion of an alcohol to a ketone namely isopropanol to acetone is illustrated.

Heated to 380 C.
Feed rate 1.625 moles/hr./tube
0.286 mole $O_2$/mole isopropanol
Reaction temperature 460–477° C.
Silver catalyst to a depth of 3 in.
Velocity 438 ft./sec.
Temperature reduced from 480° C. to about 350° C. in approximately 0.004 sec.
Conversion 82.7%
$CO_2$—0.1%

*Example IV*

In this example the conversion of isopropanol to acetone is also illustrated but with different conditions.

Heated to 380 C.
Feed rate 2.068 moles/hr./tube
0.273 mole $O_2$/mole isopropanol
Reaction temperature 434–460° C.
Silver catalyst to a depth of three inches
Velocity—518 ft./sec.
Temperature reduced from 480° C. to about 350° C. in approximately 0.0034 sec.
Conversion 74.3%
0.1% $CO_2$

*Example V*

This example illustrates using other coolants, such as a part of the ethyl alcohol feed. This was carried out in a similar manner to the previous examples except a portion of the ethyl alcohol feed was vaporized in the cooling space prior to being fed to the reaction zone to produce acetaldehyde. The feed rate was 1.006 moles/hr./tube with 0.322 mole $O_2$ per mole of alcohol. The catalyst was silver screens to a depth of approximately three inches. Conversion was 67.7% with less than 0.5% CO in the off gas.

It is thought apparent from the above examples and description that the present invention accomplishes a number of improvements as compared with prior art operations. For example, when using a water coolant, improvements were achieved as follows:

(1) The conversion was increased from 30% to 55–75%.
(2) The decomposition was reduced from 1.0% CO in the off gas to from 0.2–0.5%.
(3) Heat amounting to about 475 B.t.u./lb. aldehyde produced is recovered as 90 lb. steam, an important economic factor.
(4) The silver catalyst required in the present invention is reduced by a factor of 57.5% as compared with older operations.
(5) The catalyst life (from present studies) indicates that it will not need to be replaced or reactivated as often as the catalyst in the older type operations.

When using other coolants, such as a part of the alcohol feed, operating under Example V, advantages of the following type may be obtained:

(1) Once operating, the system generates its own heat for preheating the feed streams.
(2) There is no necessity for using steam for heating or evaporating the feed streams.

The invention has been described in detail with particular reference to preferred embodiments thereof, but it will be understood that variations and modifications can be effected within the spirit and scope of the invention as described hereinabove and as defined in the appended claims.

I claim:

1. A process for increasing the conversion of ethyl alcohol to acetaldehyde in the manufacture of acetaldehyde which comprises the following steps in respective order of occurrence:

(1) passing oxygen and ethyl alcohol at a temperature of between about 350° C. and about 700° C. through a zone containing a catalyst for the conversion of ethyl alcohol for acetaldehyde, said zone being surrounded annularly by a cooling medium separated from contact with the oxygen and ethyl alcohol reactants, thereby facilitating the removal of the exothermic heat of reaction without decreasing the amount of oxygen furnished to said zone and without adding diluent thereto;
   (2) rapidly cooling a stream of reaction products leaving said zone by directing said stream through a spiral course at high velocity through a confined path containing a channel therewithin separated therefrom and an annular channel therewithout separated therefrom containing cooling medium, thereby creating a relatively high pressure drop as compared to the pressure drop through said zone containing a catalyst for converting ethyl alcohol to acetaldehyde, substantially equalizing the pressure drop and flow throughout said zone and said spiral path and substantially preventing loss of reaction products; and
   (3) collecting acetaldehyde from said stream of reaction products.

2. The process according to claim 1 wherein the catalyst comprises a silver screen.

3. The process according to claim 1 wherein the ethyl alcohol is heated to the reactant temperature by using same as the cooling medium.

4. The process according to claim 1 wherein the heat removed from the zone containing the catalyst and the confined path through which the stream of reaction products is directed is used to preheat the oxygen and alcohol prior to passing them through the zone containing the catalyst.

5. The process according to claim 1 wherein the amount of the oxygen with respect to the amount of alcohol is from 0.15 to 0.5 mole of oxygen per mole of alcohol.

6. The process according to claim 1 wherein the amount of carbon monoxide in the gaseous reaction products is not greater than about 0.5% by weight of said gaseous reaction products.

References Cited in the file of this patent

UNITED STATES PATENTS

| | | |
|---|---|---|
| 1,426,449 | Backhaus et al. | Aug. 22, 1922 |
| 2,064,317 | Oxley et al. | Dec. 15, 1936 |
| 2,204,652 | Bludworth | June 18, 1940 |
| 2,695,220 | Bergstrom | Nov. 23, 1954 |
| 2,744,813 | Paul | May 8, 1956 |
| 2,849,492 | Allyn et al. | Aug. 26, 1958 |

UNITED STATES PATENT OFFICE
CERTIFICATE OF CORRECTION

October 8, 1963

Patent No. 3,106,581

Sanford D. Neely

It is hereby certified that error appears in the above numbered patent requiring correction and that the said Letters Patent should read as corrected below.

Column 8, line 43, for "for" read -- to --.

Signed and sealed this 5th day of May 1964.

(SEAL)
Attest:
ERNEST W. SWIDER

Attesting Officer

EDWARD J. BRENNER
Commissioner of Patents